UNITED STATES PATENT OFFICE.

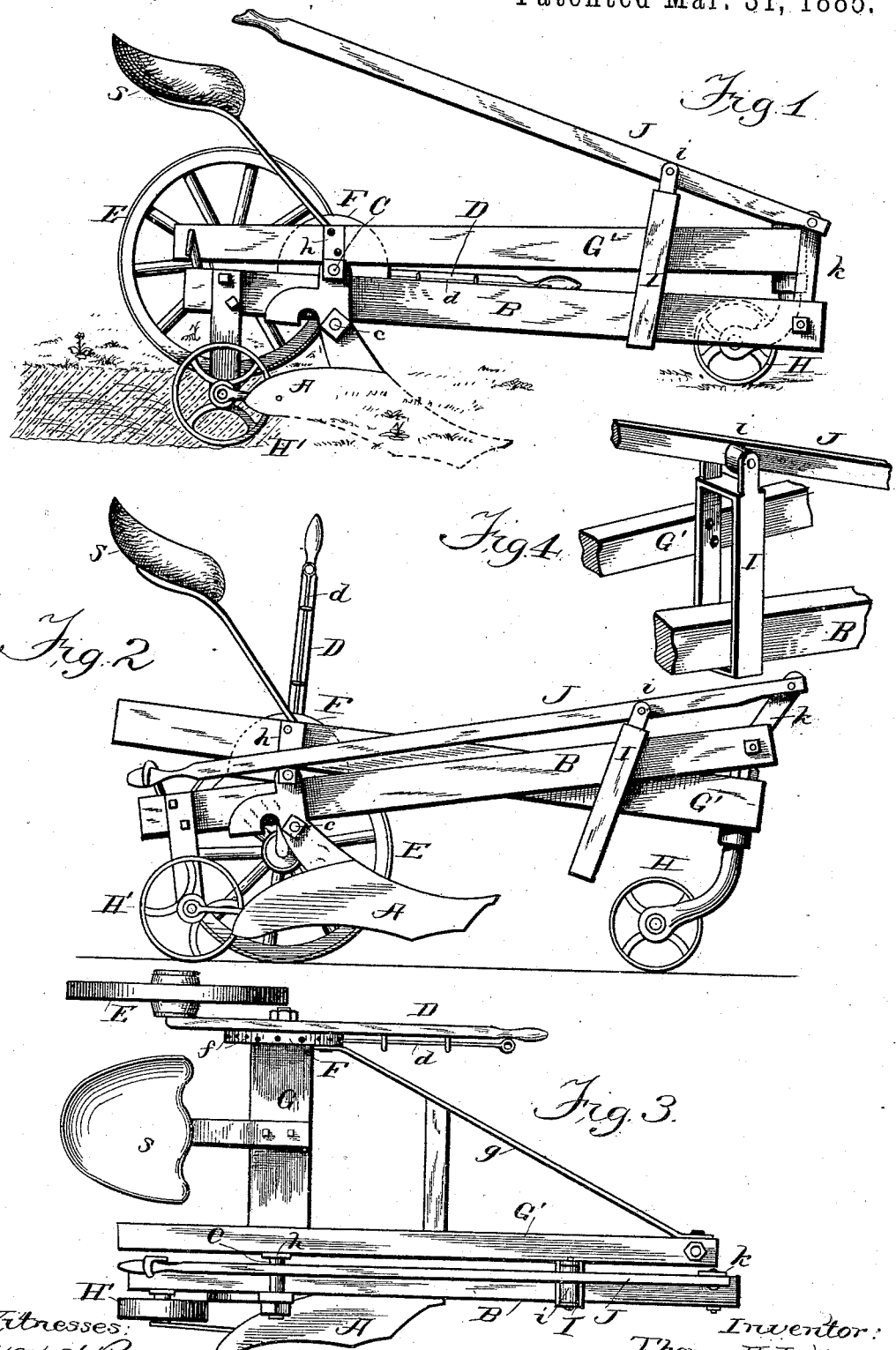

THOMAS H. LATIMER, OF T. B., MARYLAND.

SULKY-PLOW.

SPECIFICATION forming part of Letters Patent No. 314,691, dated March 31, 1885.

Application filed September 30, 1884. (No model.)

*To all whom it may concern:*

Be it known that I, THOMAS H. LATIMER, a citizen of the United States, residing at T. B., in the county of Prince George's and State of Maryland, have invented certain new and useful Improvements in Sulky-Plows; and I do hereby declare the following to be a full, clear, and exact description of the invention, such as will enable others skilled in the art to which it appertains to make and use the same.

My invention relates to that class of implements known as "sulky-plows;" and it consists in providing improved means for lowering and raising the plow-point according as it is desired to ride without plowing, as in going to or from the field, and in avoiding obstructions, or to turn a furrow.

My invention also consists in other details of construction, which will be described in the specification and more particularly pointed out in the claims.

In the drawings which accompany and form a part of this specification, Figure 1 is a side elevation of my improved plow in the position which it occupies when in use. Fig. 2 is a side elevation showing the plow raised and in position to be drawn clear of the ground. Fig. 3 is a plan. Fig. 4 is a detail perspective of a portion of the frame, plow-beam, operating-lever, and plow-beam guide.

The plow A, which is of any preferred make, is attached to the plow-beam B by any suitable means. In my construction the plow-standard is secured by nuts to the axle C, passing over the plow-beam, and to a brace, c, which passes under the plow-beam and is welded to the axle. That end of the axle which is remote from the plow-beam has its bearings in the lever D, as shown in Fig. 3, and this lever is bent at its lower end and forms the real axle of the wheel E, which supports the seat-frame on the land side of the plow. The lever D extends into a position where it can be easily grasped by the hand, and has attached to it in the manner shown a spring-actuated rod, d, which is adapted, when released, to be pressed into one or another of the holes f in the segment F and hold the lever, and consequently the outer end of the axle C, at any desired height.

Instead of the spring-actuated rod and the holes, a spring-pressed pawl and rack may be employed.

The purpose of this construction will be explained hereinafter.

Upon the axle C is mounted the seat-frame G, which consists of the cross-piece on which the seat s is supported, the side piece, G', and the brace g, bolted to the forward end of the side piece, G', and to the segment F, as shown. I secure the seat-frame to the axle by having the latter pass at one end through the brace g and the segment F, and at the other through a clip, h, bolted to the side piece, G'. A caster, H, whose standard is adjustable in the side piece, G', runs at the head of the plow, and a roller, H', whose standard is bolted to the rear of the plow-beam, runs behind the plow, either in the furrow when the plow is at work or on the surface of the ground when the plow is being carried. Since the wheel E rides on the surface of the ground and the roller H' sometimes on and sometimes below the surface, it is evident that the seat-frame will be tilted at one time or the other unless means be provided for avoiding it. By adjusting the lever D to different positions, the seat-frame can be brought to a level in any relation of the wheel E and the roller H'.

The means which I provide for lifting the plow for carrying or depressing it for work are the following: I run a guide, I, over the plow-beam and bolt it to the side piece, G', of the frame G. I secure a lever, J, to a pivot, i, at the top of the guide I, and attach the forward end of the said lever to the end of the plow-beam by a link, k. The rear end of the lever J can be grasped by the hand of the driver, as shown. If the plow is at work and it is desired to withdraw it from the ground, the driver can by depressing the lever J lift the front of the plow-beam, and by consequence the plow itself, and put it into a position to be carried along without contact with the ground. The hook secured to the plow-beam receives and holds the lever J in its lowest position. On being released the lever J will rise, allowing the plow-point to descend until it touches the ground, when the force of the draft will cause it to go to the full depth of the furrow. What that depth shall be may be determined either by adjusting the roller-standard in the side piece, G", by adjusting the guide I on the said side piece, or by regulating the distance which the plow-beam may descend in the guide I.

Having now described my invention, what I claim, and desire to secure by Letters Patent, is—

1. The combination, with the seat-frame of a sulky-plow and the plow-beam, of a guide secured to the seat-frame and embracing the plow-beam to guide and limit its throw, and a lever pivoted to the said frame and connected by a link to the plow-beam, substantially as and for the purpose set forth.

2. In combination with the seat-frame of a sulky-plow, a caster-support for the front end of the said frame and the plow-beam, a guide secured to the seat-frame and embracing the plow-beam, and a lever pivoted to the said frame and connected by a link to the said beam, substantially as set forth.

3. The combination, with plow A, plow-beam B, seat-frame G, wheel E, caster H, and roller H', of guide I, secured to the seat-frame, lever J, link $k$, and means, substantially such as described, for adjusting the seat-frame to a level in any position of the plow.

In testimony whereof I affix my signature in presence of two witnesses.

THOMAS H. LATIMER.

Witnesses:
  B. W. HUNTER,
  J. R. HUNTER.